United States Patent Office 3,129,209
Patented Apr. 14, 1964

3,129,209
PROCESS FOR THE POLYMERIZATION OF ALPHA OLEFINS
Louise D. Hague, Villanova, and Habet M. Khelghatian, Springfield, Pa., assignors to Sun Oil Company, Philadelphia, Pa., a corporation of New Jersey
No Drawing. Filed Nov. 14, 1960, Ser. No. 68,611
4 Claims. (Cl. 260—93.7)

This invention relates to a novel process for the polymerization of olefins, and more particularly to a method for the polymerization of alpha olefins having no branching in the 2-position in the presence of a catalyst consisting essentially of an aluminum sesquihalide, an essentially amorphous titanium trichloride, and methyl tetrahydrofuran, and in the presence of hydrogen.

It is known that alpha olefins may be polymerized in the presence of a catalyst comprising a transition metal chloride such as titanium trichloride, and an aluminum alkyl such as aluminum triethyl or aluminum diethyl chloride to form solid crystalline polymers having utility in the fabrication of shaped articles, films, and fibers. These aluminum alkyls are expensive, but heretofore it has not been found feasible to use the aluminum sesquihalides, which are readily and inexpensively prepared by reaction of halogenated hydrocarbons with aluminum powder, as catalyst components, since, as pointed out in U.S. Patent 2,951,066, the combination of aluminum sesquihalides and transition metal chlorides will not polymerize propylene and higher alpha olefins to solid crystalline polymers.

In copending application S.N. 65,915, filed October 31, 1960, now abandoned in which we are named as co-inventors, it is disclosed that catalyst systems comprising essentially amorphous titanium trichloride and aluminum sesquihalides may be complexed with tetrahydrofuran or alkyl derivatives thereof to yield catalyst systems having activities approaching that of catalyst systems employing the more expensive aluminum dialkyl halides.

The essentially amorphous titanium trichloride useful in the practice of the invention may be prepared by reducing titanium tetrachloride by reaction with hydrogen or aluminum to produce a titanium trichloride which exhibits a crystalline structure under X-rays. The crystalline form of titanium trichloride is then physically treated, as by ball milling or rod milling, until substantially all its crystalline structure has been destroyed. By this we mean that the X-ray diffraction intensity has been reduced to 10% or less of that observed with the untreated crystalline titanium trichloride. Unlike crystalline titanium trichloride, this form of titanium trichloride will polymerize propylene and higher alpha olefins, but the rate of polymerization with this catalyst is so slow that the use of this catalyst system is commercially impracticable.

Aluminum sesquihalides useful as catalyst components have the formula $AlR_{1.5}X_{1.5}$, where R is an alkyl, aralkyl, or aryl radical having from 2 to 12 carbon atoms, preferably ethyl, propyl, butyl, or isobutyl. Examples of useful sesquihalides are aluminum ethyl sesquichloride, aluminum ethyl sesquibromide, aluminum propyl sesquichloride, aluminum butyl sesquichloride, and aluminum phenyl sesquichloride. The mol ratio of aluminum sesquihalide to metal chloride should be in the range of 1:5 to 10:1, and preferably from about 1.5:1 to 3:1. The mol ratio of aluminum sesquihalide to the tetrahydrofuran compound should be from 10:1 to about 5:4. Lower ratios should not be used since at 1:1 ratio the rate of polymerization is very low, and at lower ratios no polymerization takes place.

Reaction conditions for the polymerization include temperatures of from 0° C. to 250° C., preferably about 70–80° C., and pressures from atmospheric to about 500 p.s.i.g. Olefins which can be polymerized with the novel catalyst system include all alpha olefins having from 2 to about 20 carbon atoms, and which do not have branching at the 2-position. Examples of such olefins are ethylene, propylene, butene-1, and 4-methylpentene-1. In the case of the normally gaseous olefins, it is preferred to conduct the reaction in the presence of an inert liquid reaction medium, preferably a hydrocarbon such as heptane, hexane, isooctane, benzene, or toluene. When the olefin to be polymerized is normally liquid under the polymerization conditions employed, the reaction medium may be dispensed with, but it is preferred to use a reaction medium even with normally liquid olefins, in order to recover the reaction product as an easily handled slurry.

We have now discovered that, when using a methyl tetrahydrofuran as the complexing agent, the reaction rate may be increased by over 70 percent if the reaction is conducted in the presence of at least 5 parts per million, based on the weight of solvent in the reactor, of hydrogen. This would appear to be most surprising, since if the complexing agent is unsubstituted or disubstituted tetrahydrofuran, hydrogen present during the reaction has little, if any, effect on the rate of polymerization. Furthermore, it appears that the amount of hydrogen present has little effect on the rate of polymerization since increasing the amount of hydrogen in the reactor, over about 5 p.p.m., does not appreciably increase the rate. However, for practical purposes, the hydrogen should be limited to about 250 p.p.m., since quantities above this amount yield a polymer which has an undesirably low molecular weight.

In order that those skilled in the art may more fully appreciate the nature of our invention and the manner of carrying it out, the following examples are given. In all instances the titanium trichloride component of the catalyst is essentially amorphous.

*Example I*

A reactor is charged with heptane, and aluminum ethyl sesquichloride and titanium trichloride, in a mol ratio of 2:1, is added in an amount such that the concentration of titanium trichloride in the heptane is 0.035 gram per 100 cc. The reactor is then sealed, the contents brought to a temperature of 160° F., and is pressured to 140 p.s.i.g. with propylene. The reactor is maintained at this temperature, with stirring, for a period of 240 minutes. At the end of this time the reaction product is treated with methanol to deactivate the catalyst, the reactor is opened, and the contents are removed. It is found that solid polypropylene has been formed at the rate of 0.05 pound of polymer per hour per gallon of heptane. The polymer obtained is 89.9% insoluble in boiling pentane.

*Example II*

A reactor is charged with heptane, and aluminum ethyl sesquichloride, titanium trichloride and tetrahydrofuran is added in a mol ratio of 2:1:1 in an amount such that the concentration of titanium trichloride in the heptane is 0.035 gram per liter. The reactor is then sealed, the temperature is brought to 160° F., and the reactor is pressured with propylene to 140 p.s.i.g. The temperature and pressure are maintained, while stirring the reactor contents, for a period of 152 minutes, after which the reaction mixture is treated with methanol to deactivate the catalyst, the reactor is opened, and the contents removed. Solid crystalline polypropylene, 95.3 percent insoluble in boiling pentane, is recovered from the reaction mixture in an amount indicating that the rate of polymerization is 0.31 pound of polymer per hour per gallon of heptane. This rate is commercially acceptable.

*Example III*

The procedure of Example II is followed except that the polymerization is carried out in the presence of 22 parts per million of hydrogen, based on the weight of the solvent. The rate of polymerization is 0.35 pound of polymer per hour per gallon of heptane. The significance of this slight increase is doubtful, since it is impossible to control the reaction conditions exactly from run to run.

*Example IV*

The procedure of Example III is followed substituting 2,5-dimethyl tetrahydrofuran for tetrahydrofuran. The rate of polymerization is 0.37 pound of polymer per hour per gallon of heptane. Without hydrogen the rate is .29 pound per gallon per hour.

*Example V*

The procedure of Example II is followed, substituting methyl tetrahydrofuran for the tetrahydrofuran used in Example II. Propylene is polymerized at the rate of 0.33 pound per hour per gallon of heptane.

*Examples VI–X*

The procedure of Example V is followed, except that the polymerization is carried out in the presence of 8 p.p.m., 22 p.p.m., 22 p.p.m. (check run), 55 p.p.m., and 88 p.p.m., respectively, by weight of hydrogen based on the weight of the solvent. Rates of polymerization are 0.53, 0.55, 0.56, 0.57, and 0.55 pound of polymer per gallon of heptane per hour, respectively.

*Example XI*

The procedure of Example V is followed, substituting aluminum ethyl sesquibromide for aluminum ethyl sesquichloride, and conducting the polymerization in the presence of 22 p.p.m. by weight of hydrogen, based on the weight of the solvent. The rate of polymerization is .50 pound of polymer per hour per gallon of heptane.

The invention claimed is:

1. In a process for the polymerization of alpha-olefins which comprises contacting an alpha-olefin free from branching at the 2-position with a catalytic composition consisting essentially of an aluminum sesquihalide having the formula $AlR_{1.5}X_{1.5}$ wherein R is a hydrocarbon radical having from 2 to 12 carbon atoms and X is selected from the group consisting of chlorine and bromine, an essentially amorphous titanium trichloride and methyl tetrahydrofuran suspended in an inert hydrocarbon solvent; wherein the mol ratio of aluminum sesquihalide to metal halide is from 1:5 to 10:1 and the mol ratio of aluminum sesquihalide to methyl tetrahydrofuran is from 10:1 to 5:4, the improvement which consists in conducting the polymerization in the presence of from 5 parts to 250 parts per million by weight, based on the weight of the solvent, of hydrogen.

2. The process according to claim 1 in which the sesquihalide is aluminum ethyl sesquichloride.

3. The process according to claim 1 in which the olefin is propylene.

4. The process according to claim 2 in which the olefin is propylene.

References Cited in the file of this patent

UNITED STATES PATENTS 2,882,264    Barnes et al. _____ Apr. 14, 1959

FOREIGN PATENTS 807,204    Great Britain _____ Jan. 7, 1959
809,717    Great Britain _____ Mar. 4, 1959